K. W. HESSLER AND W. J. BARRETT.
PLUG.
APPLICATION FILED MAY 15, 1920.

1,371,168.

Patented Mar. 8, 1921.

K. W. Hessler
W. J. Barrett
INVENTORS

BY Victor J. Evans
ATTORNEY

WITNESS:

UNITED STATES PATENT OFFICE.

KENNETH W. HESSLER AND WILLIAM J. BARRETT, OF WYOMING, PENNSYLVANIA.

PLUG.

1,371,168.　　　　Specification of Letters Patent.　　Patented Mar. 8, 1921.

Application filed May 15, 1920. Serial No. 381,700.

*To all whom it may concern:*

Be it known that we, KENNETH W. HESSLER and WILLIAM J. BARRETT, citizens of United States of America, residing at Wyoming, in the county of Luzerne and State of Pennsylvania, have invented new and useful Improvements in Plugs, of which the following is a specification.

This invention relates to devices for repairing boilers and has for an object the provision of a plug, which may be easily and quickly applied for the purpose of stopping leaks.

Another object of the invention is the provision of a plug of this character which may be applied in position and adjusted from the outside of the boiler to effect a leak proof joint.

With the above and other objects in view, the invention includes the following novel features and details of construction, to be hereinafter more fully described, illustrated in the accompanying drawings and pointed out in the appended claim.

In the drawings:—

Figure 1:
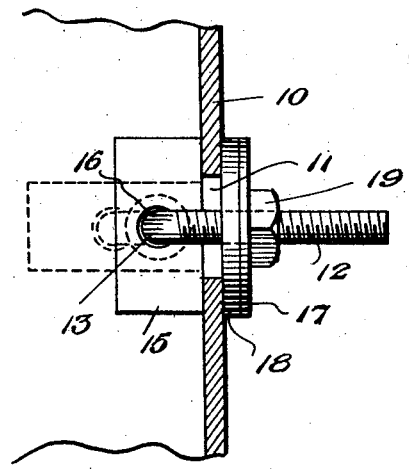
Figure 1 is a sectional view of a fragmentary portion of the boiler showing by full lines the position of the plug when in position and by dotted lines in the position of a retaining member when the plug is being adjusted in place.
Figure 2:
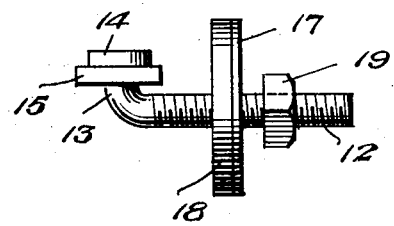
Fig. 2 is an elevation of the plug.

Referring to the drawings in detail, wherein like characters of reference denote corresponding parts, the reference character 10 denotes a portion of a boiler casing having an opening 11 therein.

The plug, which is for the purpose of closing this opening to prevent leakage includes a shank 12, which is threaded at one end as shown and has its opposite end provided with a laterally curved extremity 13 which is disposed at right angles to the length of the shank. At this end the shank is provided with a head 14.

Mounted upon the shaft or upon the right angularly disposed portion thereof is a retaining member in the form of a flat rectangular plate 15, the latter being provided with an opening 16 which receives the shank and permits the retaining member to be rotated thereon, In addition, the shank is provided with a metal washer 17 and a rubber or other compressible washer 18, while threaded upon the shank is a nut 19.

In the use of the device the retaining member is positioned to show the dotted lines in Fig. 1, and said member is inserted through the opening 11 in the boiler. The retaining member is then rotated upon the shank in the position shown in the full lines in Fig. 1 and the washers are adjusted tightly upon the outer face of the boiler by means of the nut 19, the washer 18 being tightly compressed so as to provide a leak proof joint.

The invention is susceptible of various changes in its form, proportions and minor details of construction and the right is herein reserved to make such changes as properly fall within the scope of the appended claim.

Having described the invention what is claimed is:—

A plug of the class described comprising a threaded shank, a right angularly disposed headed portion located at one end of the shank, an elongated rectangular member mounted for pivotal movement upon the right angularly disposed portion of the shank to provide an offset stop for insertion through an opening, said stop being capable of rotation to prevent passage through said opening, a washer carried by the shank, a compressible washer also carried by the shank interposed between the first mentioned washer and the rectangular member and means threadedly engaging the shank for holding the washers in position.

In testimony whereof we affix our signatures.

KENNETH W. HESSLER.
WILLIAM J. BARRETT.